United States Patent [19]  
Takayama

[11] Patent Number: 4,684,426  
[45] Date of Patent: Aug. 4, 1987

[54] METHOD OF MANUFACTURING A CONTAINER CAP WITH A CONCEALED MARK

[75] Inventor: Hajime Takayama, Edogawa, Japan
[73] Assignee: Shibazaki Seisakusho Ltd., Japan
[21] Appl. No.: 751,086
[22] Filed: Jul. 2, 1985
[51] Int. Cl.⁴ .............................................. B32B 31/20
[52] U.S. Cl. ..................................... 156/220; 53/129; 156/262; 156/277; 215/230; 215/253; 215/341; 413/9; 428/43; 428/64
[58] Field of Search ................. 53/129; 156/219, 220, 156/262, 277; 215/230, 250, 253, 316, 341; 413/9; 428/43, 64; 264/268

[56] References Cited
U.S. PATENT DOCUMENTS

| | | | |
|---|---|---|---|
| 3,004,297 | 10/1961 | Stover | 413/9 X |
| 3,037,474 | 6/1962 | Navikas | 156/262 X |
| 3,344,093 | 9/1967 | Strickman | 413/9 X |
| 3,361,281 | 1/1968 | Kehe | 156/262 X |
| 3,547,746 | 12/1970 | Gwinner | 264/268 X |
| 3,581,690 | 6/1971 | Zapata | 413/9 |
| 3,616,954 | 11/1971 | Peck | 156/262 X |
| 4,272,313 | 6/1981 | Mori et al. | 156/262 |

Primary Examiner—Robert A. Dawson  
Attorney, Agent, or Firm—Darby & Darby

[57] ABSTRACT

A method of manufacturing a container cap with a concealed mark is disclosed. The mark is provided to the central portion of one of both the inside face of the top panel and one side of a seat member made of a thermoplastic material. The seat member is then placed on the inside face of the top panel so that the one side of the seat member faces the inside face of the top panel. The seat member is thereafter heated for softening. The other side of the seat member, heated and placed on the inside face of the top panel, is depressed to form a manually tearable line surrounding the mark in the other side of the seat member, thus defining a gasket portion in the seat member outside the tearable line and a manually removable portion, overlying the mark, inside the tearable line, and to attach a gasket portion to the top panel.

7 Claims, 10 Drawing Figures

METHOD OF MANUFACTURING A CONTAINER CAP WITH A CONCEALED MARK

BACKGROUND OF THE INVENTION

The present invention relates to a method of manufacturing a container cap having a mark or indicia concealed in it, the container being, for example, a soft drink bottle with a prize, having a cap with a winning mark concealed in it.

One typical method for manufacturing such a mark is the so-called "in-shell molding" method. In this method, a mark is applied on the inside face of the top panel of a cap shell by printing or like processes, a molten material of a synthetic resin is placed on the mark-printed face of the top panel and the molten material is subsequently embossed to form into a gasket member concealing the mark.

This in-shell-moulding method requires high speed supply of a molten resin to each cap shell in a predetermined amount. This necessitates a special extrusion device which is expensive, and hence this method is disadvantageous in that it is high in equipment cost.

Furthermore, this conventional method necessitates an additional die which is adapted to be inserted into a cap shell so as to surround the outer periphery of a gasket to be formed during embossing for preventing the molten resin from being squeezed out through the clearance between the cap shell and the embossing die inserted in it. The gasket completed according to this method has a clearance between its outer periphery and the skirt of the cap shell due to the insertion of the additional die. Thus, this method has another disadvantage in that the cap can provide insufficient sealing to a mouth of a container over which it is fitted, and hence a special design is required for the mouth of the container in order to provide reliable sealing to it.

SUMMARY OF THE INVENTION

It is an object of the present invention to provide a method of manufacturing a container cap with a concealed mark in which the apparatus for manufacturing the cap is simplified, and equipment cost for the cap is hence reduced.

It is another object of the present invention to provide a method of manufacturing a container cap with a concealed mark, in which a gasket is formed to cover the whole peripheral portion of the inside face of the top panel of the cap, so that caps which provide reliable sealing to mouths of containers are easily manufactured.

With these and other objects in view, the present invention provides a method of manufacturing a container cap with a concealed mark. The mark is provided to the central portion of one of both the inside face of the top panel and one side of a seat member made of a thermoplastic material. The seat member is then placed on the inside face of the top panel so that the one side of the seat member faces the inside face of the top panel. The seat member is thereafter heated for softening. The other side of the seat member, heated and placed on the inside face of the top panel, is depressed to form a manually tearable line surrounding the mark in the other side of the seat member, thus defining a gasket portion in the seat member outside the tearable line and a manually removable portion, overlying the mark, inside the tearable line, and to attach a gasket portion to the top panel.

DETAILED DESCRIPTION OF PREFERRED EMBODIMENTS

Figure 1:
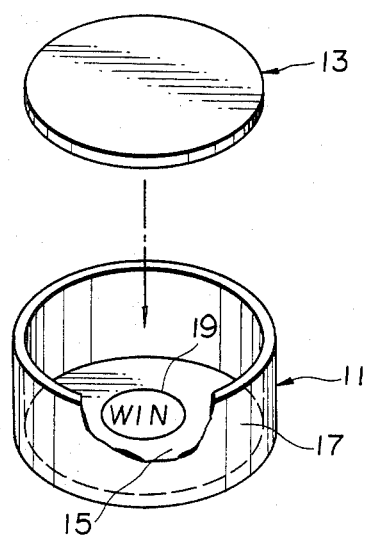
FIG. 1 is a perspective view, partly broken away, of a cap shell and a seat member adopted in one embodiment of the present invention.
Figure 2:
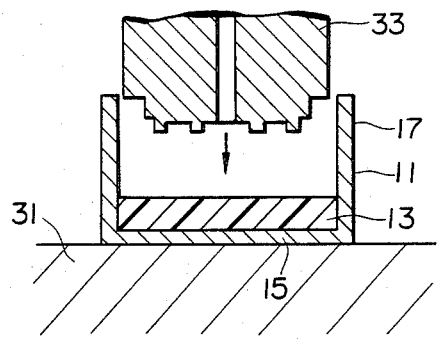
FIG. 2 is a diagrammatical vertical section of the cap shell in FIG. 1 with the seat member placed in it and an embossing die before embossing.
Figure 3:
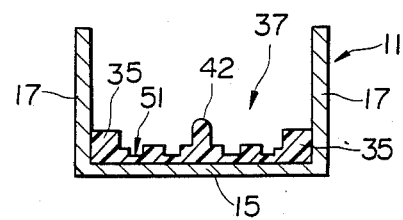
FIG. 3 is a diagrammatical vertical section of a completed cap produced with the cap shell and the seat member in FIG. 1.

Referring to FIGS. 1 to 3, reference numeral 11 designates a cap shell for covering the opening of a container, not shown, such as a soft drink bottle, and 13 indicates a disc-shaped seat member. The cap shell 11 is formed by deep drawing a metal sheet made of such as AA (JIS) 1000 and 3000 aluminum and includes a top disc panel 15 and a cylindrical skirt 17 depending from the periphery of the top panel 15. The seat 13 is formed by die cutting a sheet made of a thermoplastic soft material such as a low density polyethylene, nonrigid polyvinyl chloride resin, ethylene-vinyl acetate resin. The diameter of the seat 13 is substantially equal to the inner diameter of the skirt 17 and it is fitted into the cap shell 11 to rest on the inside face of the top panel 15 as shown in FIG. 2. Typically, the cap shell 11 has an outer diameter about 29 mm and a thickness about 0.65 mm. The length of the skirt 17 is about 15 mm.

Figure 5:
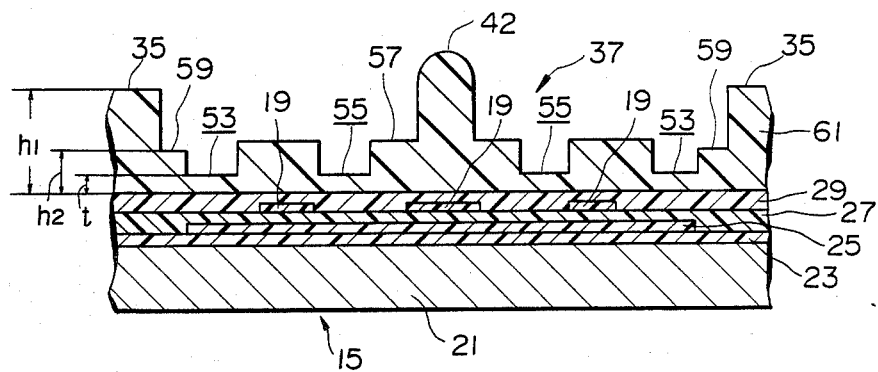
FIG. 5 is an enlarged vertical sectional view of the essential portion of the cap shell in FIG. 3.

In this embodiment, a winning mark 19 to be concealed is formed in the inside of the top plate 15 of the shell 11 as follows. The top panel 15 is, as shown in FIG. 5, provided over its inside face with a plurality of coating layers having an overall thickness about 10–12μ. The coating layers include a base coat layer 23 applied on the inside faces of the cap shell 11 and a removable print layer 25 coated over the base coat layer 23. The base coat layer 23 is made of an epoxy phenol type paint and is formed for protecting the cap shell 11. The removable print layer 25 is formed into a disc shape at the central portion of the top panel 21 by printing a conventional removable ink on the base coat layer 23. This removable ink is an ink which has low adhesion strength with respect to the base coat layer 23 and is easily removable from that base coat layer. Over the base coat layer 23 and the removable print layer 25, there is coated a transparent removable coat layer 27 by applying an epoxy phenol type paint. The mark 19 is formed on this removable coat layer 27 above the removable print layer 25 by applying a printing ink in a conventional manner such as printing, hot stamping or the like. Over the mark 19 and the removable coat layer 27 there is coated an adhesive coat layer 29 by applying a conventional adhesive which has strong bonding strength with respect to the seat 13 as well as both the mark 19 and the removable coat layer 27. In view of the bonding strength, adhesive coat layer 29 may be made of an epoxy phenol resin for the seat 13 made of a polyethylene resin or the adhesive coat layer may be formed with a vinyl resin for the seat 13 made of a polyvinylchloride resin. In this embodiment, the removable print layer 25 and the mark 19 is formed by offset printing and the other layers, i.e., base coat layer 23, removable coat layer 27 and adhesive coat layer 29 are formed by roll coating. Typical dimensions of these layers are as follows:

TABLE 1

| Layer | Thickness ($\mu$) |
| --- | --- |
| Base coat layer | 2–3 |
| Removable print layer | 0.5–1 |
| Removable coat layer | 2–3 |
| Mark | 0.2–0.3 |
| Adhesive coat layer | 3–4 |

Subsequently, the seat 13 is placed within the cap shell 11 thus prepared so as to come into contact with the adhesive coat layer 29. The seat 13 is softened by heating it. Preferably, this heat softening is, as shown in FIG. 2, carried out by placing the cap shell 11 which has the seat 13 fitted in it on a hot plate 31 maintained at a predetermined temperature and then by softening the seat 13 with heat transmitted through the top panel 15 of the cap shell 11. When the seat member 13 is made of a low density polyethylene, the cap shell 11 is placed on the hot plate 31, maintained at about 190°–230° C., for about 2–3 sec.

Thereafter, the seat 13 thus softened is, as shown in FIG. 2, embossed by means of a die 33 to form a ring-shaped gasket portion 35 for sealing the lip portion of a container and a removable portion 37 integrally formed inside the gasket portion 35. Preferably, this embossing is carried out when the seat member 13 reaches to a Vicat softening point. When the seat member 13 is made of a low density polyethylene, it is preferably heated to about 80°–90° C. During this embossing the die 33 is maintained at a temperature lower than the temperature of the softened seat 13. For example, the die 33 is kept at about 40°–50° C. for the low density polyethylene seat member 13.

Figure 4:
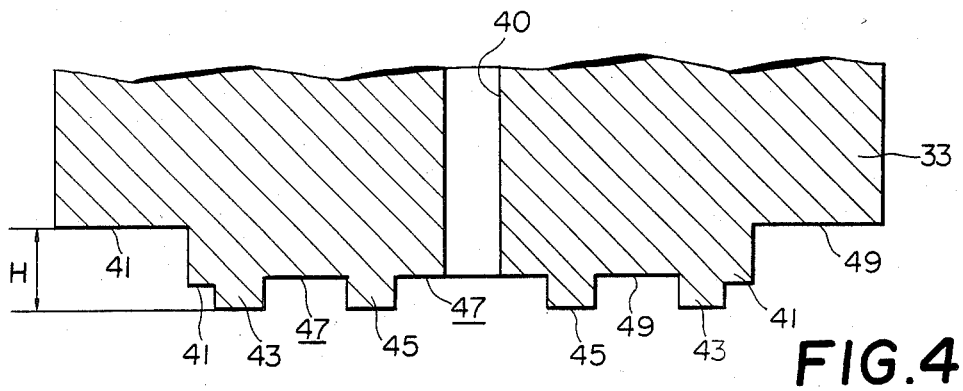
FIG. 4 is an enlarged vertical cross-sectional view of the essential portion of the die in FIG. 2.
Figure 6:
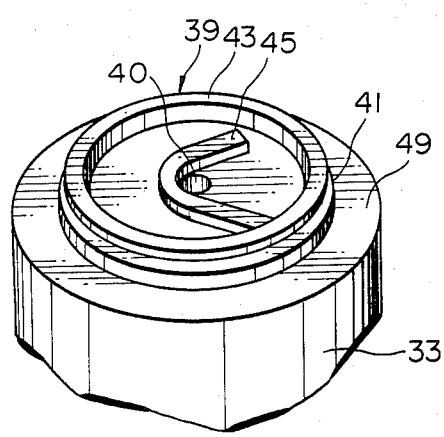
FIG. 6 is an enlarged perspective view illustrating the die in FIG. 2.

The die 33 has a cylindrical shape, as shown in FIG. 6, and is provided on its front face with a rib portion 39 for forming a tearable groove as a weakened line of the removable portion 37, with a circular shoulder 41 for adhering the gasket portion 35 to the top panel 15 and with a through hole 40 for forming a stem 42 as a pull member. The rib portion 39 consists of a ring-shaped rib 43 and a hook-shaped rib 45 formed inside the ring-shaped rib 43. One end of the hook-shaped rib 45 is connected to the ring-shaped rib 43 an shown in FIG. 6. The gasket portion adhering shoulder 41 is formed continuously with and around the ring-shaped rib 43 at a level below the front face of the ring-shaped rib 43 as more clearly seen from FIG. 4. A recess 47 is defined between the ring-shaped rib 43 and the hook-shaped rib 45 so that the bottom of the recess 47 is at a level above a marginal portion 49 of the front face of the die 33. With this construction, the removable portion 37 of the seat 13 is strongly depressed by the rib portion 39 and the recess 47 during the embossing of that seat, so that the thickness of the removable portion 37 is reduced. The difference in height H between the front face of the rib 43 and the marginal portion 49 is preferably designed to be substantially equal to or larger than the thickness of the seat 13 so that the marginal portion 49 may not strongly press or may not be brought into contact with the marginal portion of the seat 13 during the embossing of that seat, resulting in no substantial change in thickness of the seat. The stem forming hole 40 is formed inside and adjacent to the curved portion of the hook-shaped rib 45.

Figure 7:
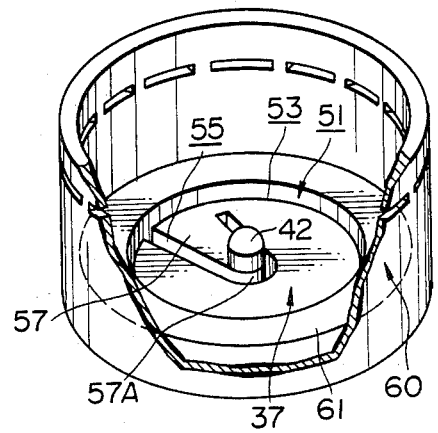
FIG. 7 is an enlarged perspective view, partly broken away, of the cap in FIG. 3.

During embossing the seat 13 with this die 33, a portion of the seat 13 which is depressed by the rib portion 39 to the largest degree is reduced in thickness to form a manually tearable groove portion 51 as the weakened line which can be easily torn when the stem 42 is pulled. The tearable groove portion consists of a ring-shaped groove 53 and a hook-shaped groove 55 which are complementary to the ring-shaped rib 43 and the hook-shaped rib 45 of the die 33 respectively. One end of the hook-shaped groove 55 is communicated to the ring-shaped groove 53 as shown in FIG. 7. The embossed seat 13 is formed by the presence of the ring-shaped groove 53 into two integral parts, i.e., the gasket portion 35, disposed outside the ring-shaped groove 53, and the removable portion 37 disposed inside that groove. In the removable portion 37 there is formed a tongue portion 57 by the hook-shaped groove 55 as clearly seen in FIG. 7. The removable portion 37 is less strongly depressed by the die 33 than the tearable groove portion 51 and reduced in thickness. By this reduction in thickness of the removable portion 37 some material of the softened seat 13 flows into the hole 40 of the die 33 to thereby form the stem 42 which, as viewed in FIG. 7, projects upwards from the curved end 57A of the tongue portion 57, the curved end 57A serving as a starting portion for tearing the tearable groove 51. The hole 40 is a through hole which communicates to the atmosphere and hence air does not stay in it when the softened material flows into that hole. With such a construction, the height of the stem 42 is easily set. The removable portion 37 is impressed by the die 33, so that it is strongly adhered to the adhesion coat layer 29.

The gasket portion 35 has a securing portion 59 annularly forxed inside it by pressing the gasket adhering shoulder 41, so that the securing portion 59 is strongly adhered to the adhesion coat layer 29 by this depressing. The gasket portion 35 is attached to the cap shell 11 through the securing portion 59 and the coating layers. The thickness of the gasket portion 35, except the securing portion 59, is maintained substantially equal to the initial thickness of the seat member 13 since the gasket portion 35 is formed by the marginal portion 49 of the die 33 and since the difference H in height between the marginal portion 49 and the front face of the ring-shaped rib 43 is substantially equal to or larger than the thickness of the seat material 13.

The embossed seat 13 thus completed typically has the following dimensions (FIG. 5):

| | |
| --- | --- |
| The height of the gasket portion 35 ($h_1$) | 0.7–0.8 mm |
| The height of the securing portion 59 ($h_2$) | 0.5–0.6 mm |
| The thickness of the bottom | 0.05–0.1 mm |

| -continued |
| --- |
| wall of the groove 53 (t) |

The cap 60 thus prepared having the mark 19 concealed in it is illustrated in FIG. 7. The cap 60 is fitted around the mouth of a container such as a bottle by a conventional capping machine and is thread rolled to fit to the thread of the mouth of the container in a conventional manner, so that the cap 60 is removably attached to it.

Figure 8:
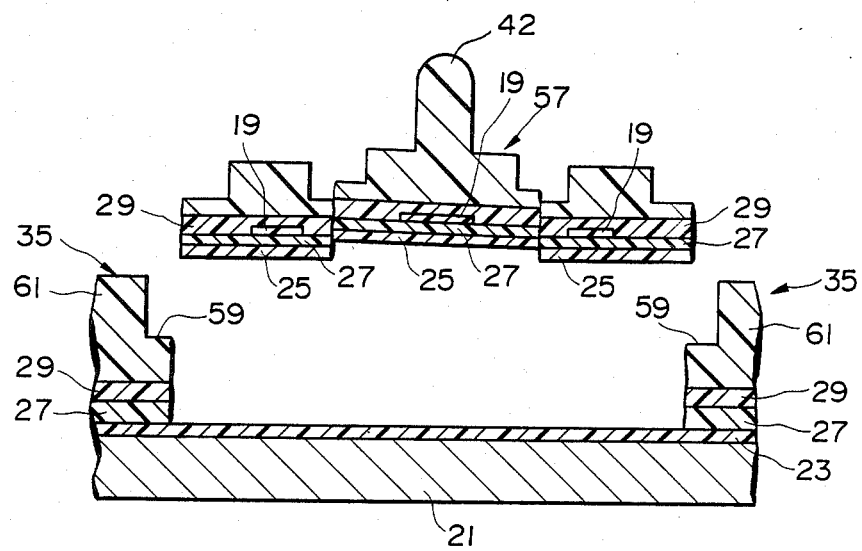
FIG. 8 is enlarged vertical sections of the top panel and the removable portion of the cap in FIG. 4.

To see the concealed mark 19 the stem 42 is, first of all, pulled to commence the tearing of the bottom wall of the groove 51 from the starting portion 57A after the cap 60 is removed from the mouth of the container. By tearing the bottom of the hook-shaped groove 55, the tongue-shaped portion 57 is removed from the remaining part of the removable portion 37 and then the remaining part is removed by completely tearing the bottom of the ring-shaped groove 53. At the same time the adhesive coat layer 29, the removable coat layer 27 and the removable print layer 25 are torn along the torn grooves 53 and 55. In this tearing of the bottom of the groove portion, separation between the removable print layer 25 and the base coat layer 23 occurs since the adhesive strength between them is smaller than the bonding strength between the removable print layer 25 and the coat layer 27. Thus, the removable portion 37 is taken away from the top panel 21 of the shell 11 together with the removed parts of adhesive layer 29. coat layer 27 and removable print layer 25 as clearly illustrated in FIG. 8. The remaining part of the removable coat layer 27 which lies below the gasket portion 35 is remained unseparated from the base coat 23. The gasket portion 35 is attached to the base coat 23 by the adhesion of the unremoved part of the coat layer 27, positioned below the gasket portion, to the base coat 23, and hence it can be reused for sealing the lip of the container.

In the above embodiment, a disc material having a uniform thickness is used for the seat member 13, and the gasket portion 35 is not so strongly depressed as to be plastically deformed during the embossing of the seat member. Thus, the gasket 61 is formed with uniform thickness, and hence provides excellent sealing of the lip of the container.

The seat member 23 is embossed in a softened state and hence there is no possibility such that a material to be embossed is, as in the prior art, squeezed out through the clearance between the die and the cap during the embossing step. For this reason, the production method according to the present invention does not require any device which is to be inserted into the cap shell to surround the gasket portion during embossing so that the softened material may not flow out of the cap. Thus, according to the present invention the outer periphery of the gasket 35 may be formed to fit to the inside wall of the skirt of a cap, and hence a cap having an excellent sealing performance can be provided.

Figure 9:
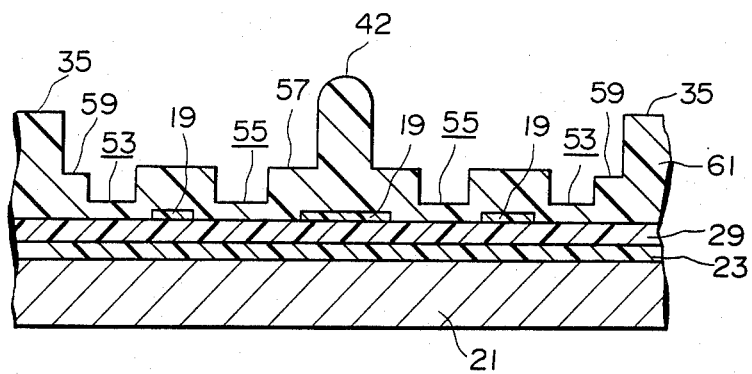
FIG. 9 is an enlarged vertical section of an essential portion of a modified form of the cap shell in FIG. 5.

Two modified forms of the cap shell 11 will be described with reference to FIGS. 9 and 10, in which parts similar to those of the preceding embodiment are indicated by like reference numerals and explanations thereof are omitted. In a modification shown in FIG. 9, the mark 19 may be provided to the inside of the seat member 13. In this case, the top coat 29 is coated over the base coat 23 and the seat member 13 with the mark 19 is place on the top coat layer 29. For easy separation from the removable portion 37, the top coat layer 29 may be made of an epoxy phenol paint when a polyvinyl chloride resin is used for the removable portion 37, or the top coat layer may be formed of a vinyl paint when a polyethylene resin is used for the seat member 13. In this modified form, when the stem 42 is pulled, the removable portion 37 is separated from the top coat layer 29 although the bottom walls of the grooves 53 and 55 are torn as in the preceding embodiment.

Figure 10:
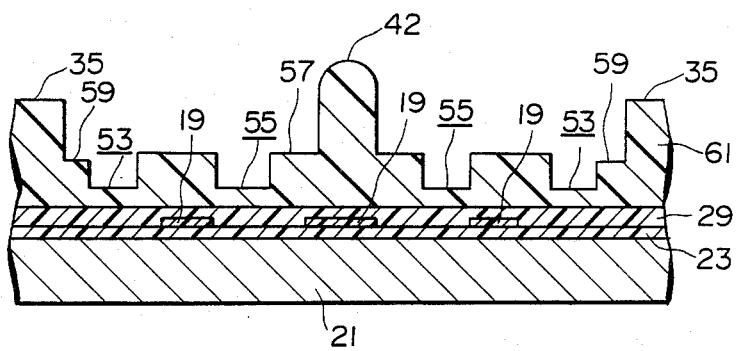
FIG. 10 is an enlarged vertical section of an essential portion of another modification of the cap shell in FIG. 5.

In another modified form of the cap shell 11 shown in FIG. 10, the mark 19 may be left on the top panel side of the cap 11 after the removable portion 37 is removed. In this case, the removable printed layer 25 and the removable coat layer 27 are omitted and the marks 19 are printed on the base coat layer 23. For easy separation from the removable portion 37, the top coat layer 29 may be formed of a vinyl paint when the seat member 13 is made of a polyethylene resin, or the top coat layer 29 may be made of an epoxy phenol paint when the seat member 13 is formed of a polyvinyl chloride resin. In this modified form, when the stem 42 is pulled, the removable portion 37 is separated from the top coat layer 29 although the bottom walls of the grooves 53 and 55 are torn as in the preceding embodiment.

For heating and softening the seat member 13, electromagnetic induction heating, dielectric heating, high-frequency heating and the like processing may be adopted in the present invention.

In the previous embodiment, the seat member 13 is embossed after it is heated and softened, but the embossing and the softening may be simultaneously carried out. Further, the gasket 35 is attached not directly but through the securing portion 59 to the top panel 21, and hence non-adhesive paint, ink, etc may be applied over portions of the coat layer 23 and the adhesive coat layer 29 which lie below the ring-shaped gasket 35.

The shoulder 41 for forming the securing portion 59 of the gasket portion 35 is not necessarily provided to the die 33. When the seat member 23 is depressed by means of a die having no such shoulder 41, the outside portion, surrounding the ring-shaped groove 53, of the seat member 13 is resiliently deformed during embossing, so that it is strongly depressed against the top panel 21 and is thus sufficiently adhered to it.

What is claimed is:

1. A method of manufacturing a container cap having a mark concealed therein, the cap including a panel portion and a skirt portion depending from the periphery of the panel portion, the method comprising:
   (a) providing the mark to a central portion of one of both the inside face of the panel portion and one side of a disk-shaped seat member made of a thermoplastic material;
   (b) then, placing the seat member over the inside face of the panel portion so that the one side of the seat member faces the inside face of the panel portion, the diameter of the seat member being substantially equal to the inner diameter of the skirt portion;
   (c) softening the seat member placed over the inside face of the panel portion by heating the seat member; and
   (d) after or simultaneously with the step (c), depressing the other side of the seat member for forming an annular manually tearable line in the other side of the seat member, thereby defining in the seat member a gasket portion outside the tearable line and a manually removable portion, overlying the mark, inside the tearable line, and for attaching the gasket portion to the panel portion.

2. A method of manufacturing a container cap as recited in claim 1, wherein the forming step (d) comprises forming a portion projected form the removable portion for pulling the removable portion to be torn along the tearable line.

3. A method of manufacturing a container cap as recited in claim 2, wherein in the step (d), the seat member is partly depressed to at most such a degree that the depressed portion is elastically deformed to form the gasket portion so that the outer periphery of the gasket portion fits to the inside wall of the skirt portion.

4. A method of manufacturing a container cap as recited in claim 3, the step (d) further including depressing the inner periphery of the gasket portion adjacent to the tearable line for plastic deformation to thereby attach the gasket portion to the panel of the cap through depressed inner periphery.

5. A method of manufacturing a container cap as recited in claim 4, wherein the tearable line is a groove.

6. A method of manufacturing a container cap as recited in claim 5, wherein the tearable line, the projected portion, the gasket portion and the depressed inner periphery of the gasket portion are formed by embossing.

7. A method as recited in claim 2, wherein said projected portion is formed by allowing part of the removable portion to project upwards during the depressing step.

* * * * *